United States Patent [19]

Papa et al.

[11] 3,983,101

[45] Sept. 28, 1976

[54] WATER-SOLUBLE POLYAZO COMPOUND DERIVED FROM 4-4-DIAMINOBENZANILIDE

[75] Inventors: Sisto Sergio Papa; Antonino Condó, both of Milan; Renzo Ferrario, Ceriano Laghetto (Milan), all of Italy

[73] Assignee: Aziende Colori Nazionali Affini ACNA S.p.A., Milan, Italy

[22] Filed: Oct. 28, 1975

[21] Appl. No.: 625,908

Related U.S. Application Data

[62] Division of Ser. No. 547,171, Feb. 5, 1975.

[30] Foreign Application Priority Data

Feb. 11, 1974 Italy.................................. 20381/74

[52] U.S. Cl............................ 260/144; 260/145 C; 260/173
[51] Int. Cl.².......................................... C09B 35/50
[58] Field of Search..................................... 260/144

[56] References Cited
UNITED STATES PATENTS 2,204,230  6/1940  Rossander et al. .................. 260/144

Primary Examiner—Charles F. Warren
Attorney, Agent, or Firm—Hubbell, Cohen, Stiefel & Gross

[57] ABSTRACT

Sulphonated azoic dyestuffs of the formula:

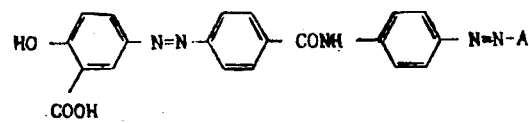

wherein A is:

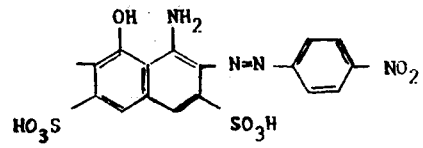

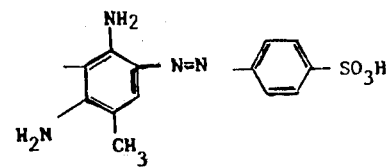

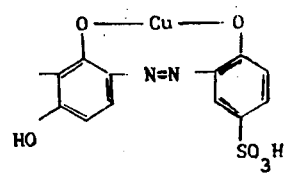

, or (I)

are useful in dyeing cotton, other cellulosic fibers, natural and synthetic polyamide fibers and leather.

1 Claim, No Drawings

WATER-SOLUBLE POLYAZO COMPOUND DERIVED FROM 4-4-DIAMINOBENZANILIDE

CROSS REFERENCE TO RELATED APPLICATIONS

This is a division of applicaton Ser. No. 547,171 filed Feb. 5, 1975.

DESCRIPTION OF THE INVENTION

The present invention relates to a new class of sulphonated azoic dyestuffs which are well suited for the direct dyeing of cotton and other cellulosic fibers, such as flax, regenerated cellulose fibers, hemp and jute; natural and synthetic polyamide fibers and blends thereof, as well as leather and other similar materials.

The invention provides a new class of water-soluble azoic dyestuffs having the formula:

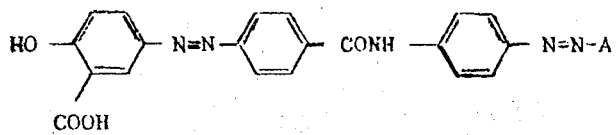

(I)

wherein A is:

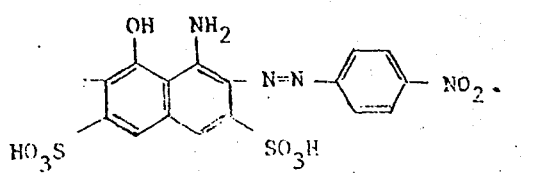

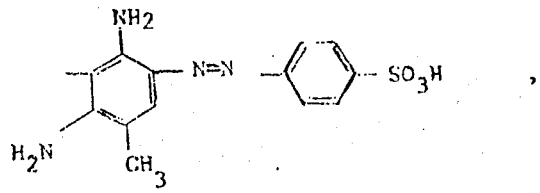

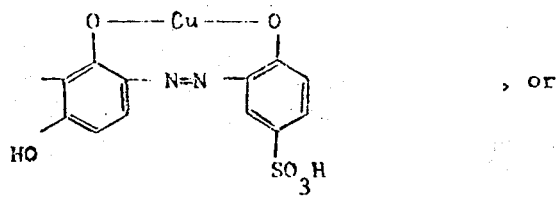

, or

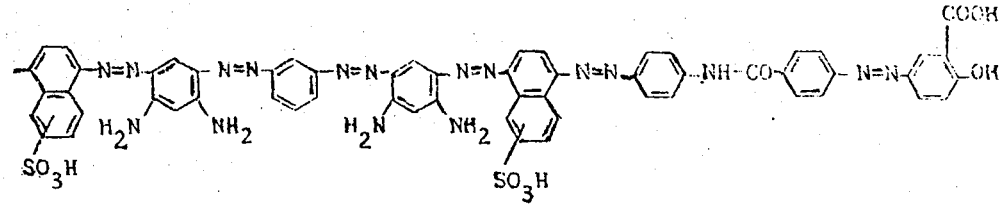

These direct dyestuffs have characteristics similar to those of the conventional direct dyestuffs of the benzidine series, but the process for preparing them does not involve any toxicological risks. Actually, benzidine and its derivatives, which are used in preparing conventional dyestuffs having characteristics which are similar to those according to the invention, are dangerous substances, i.e., they are carcinogenic and, consequently, the use and preparation thereof are extremely harmful to personnel handling them.

The direct dyestuffs of the invention may be prepared according to methods known in the art.

These dyestuffs dye cellulosic fibers, azotized fibers and leather in dark shades ranging from green to brown.

Dyeing of fibers with the dyestuffs of the invention is carried out using the same methods as are used with conventional direct benzidinic dyestuffs, i.e., at a temperature generally ranging between 50° and 100°C., in an aqueous bath containing suitable amounts, e.g. from 0.01% to 2-3% or according to the user's exigence, of dyestuff and from 5 to 20% (with respect to the fiber weight) of anhydrous $Na_2SO_4$ or of NaCl.

The following examples are given to illustrate the invention, all parts given, being understood as parts by weight unless otherwise indicated.

EXAMPLE 1

19.6 parts of sulphanilic acid suspended in 170 parts of water, 16.7 parts of 20°Be HCl, and 100 parts of ice were diazotized at 0°C. by pouring thereinto, over a period of 20–30 minutes, 7.8 parts of $NaNO_2$ as a 20% solution (parts/volume). The mixture was stirred for 2 hours and the excess nitrous acid was removed using sulphamic acid. The diazotization mass was poured, over a period of 15 minutes, onto a solution of 12.2 parts of m-toluylenediamine in 200 parts of water, 100 parts of ice and 22 parts of 20° Be HCl.

The pH value of the mixture was brought to 5.5–6 by dropping in over a period of 1 hour, a solution of 20.7 g. of NaHCO₃ in 200 parts of water, and stirring was continued overnight. The next morning, the mixture was heated to 40°–45°C., and 140 parts of an aqueous solution of 10% Na₂CO₃ (parts/weight) were admixed thereto, the resulting pH value being 9–9.5. Once solution was completed, it was cooled to 10°C. with ice and a diazo-monoazoic mass, separately prepared by coupling 4,4'-diaminobenzanilide with salicylic acid, as hereinafter described, was admixed thereto. The temperature was 10°C. and the pH value about 8. The reaction mixture was stirred overnight, and the next morning it was heated to about 70°C, acidified with 28 parts of 20° Be HCl and salted with 300 parts of rock salt. The product was filtered under vacuum and washed with a 10% brine solution. It was then squeezed dry. The product thus obtained, after being dried at 70°–80°C. for 24 hours, dyes cellulose fibers in yellowish-brown shades.

The above-mentioned diazo-monoazoic mass was prepared as follows.

22.7 parts of 4-4'-diaminobenzanilide, suspended in 100 parts of water and 52 parts of 20° Be hydrochloric acid are tetraazotized, after cooling with 100 parts of ice, by dropping thereinto, at 0°–5°C., a solution of 14 parts of NaNO₂ in 60 parts of water. After stirring for 60 minutes, the excess nitrous acid was removed using sulphamic acid.

15 parts of salicylic acid were dissolved in 150 parts of H₂O and 14.6 parts of 36° Be NaOH. The resulting solution, to which were added 5 parts of Na₂CO₃ as a 20% solution (parts/volume) and cooled to 0°–2°C. with 50 parts of ice, was rapidly admixed within about 2 minutes) to the tetrazo-mass. 15 parts of Na₂CO₃ as a 20% solution (parts/volume) were poured into the reaction mixture over a period of 1 hour. The temperature was kept at 0°–2°C. and the pH value at about 9. Finally, the product was stirred for 2 hours to complete the coupling.

EXAMPLE 2

18.9 parts of 2-amino-phenol-4-sulphonic acid suspended in 150 parts of water and 10.5 parts of 20° Be hydrochloric acid were cooled with 100 parts of ice and were diazotized, at 0–5°C. by dropping thereinto, over 30 minutes, a solution of 7 parts of NaNO₂ in 30 parts of H₂O. After stirring for 60 minutes, the excess nitrous acid was removed using sulphamic acid.

11.6 parts of resorcin were dissolved in 70 parts of water and 13.3 parts of 36° Be NaOH. The diazotization mass was poured over a 1 hour period onto the solution thus obtained, while keeping the temperature at 0°–5°C. with 150 parts of ice and maintaining a pH value of about 9 with 26.5 parts of 36° Be NaOH. Stirring was carried on for 1 hour to complete the coupling, whereupon a solution of 26 parts of CuSO₄.5H₂O in 80 parts of H₂O at 70°C. was admixed thereto. Then 8 parts of sodium acetate.3H₂O were added to the mixture. The whole mass was kept for 3 hours at 35°–40°C., the pH value being 5–5.5. It was then salted with 45 parts of rock salt. The resulting precipitate was filtered under vacuum and squeezed dry. The cake was treated with 150 parts of water at 40°C. and solubilized by adding a solution of 15 parts of Na₂CO₃ in 70 parts of H₂O, at a pH of about 9. While keeping the temperature at 10°–15°C., the solution was poured onto a diazo-monoazoic mass, prepared separately by coupling 4,4'-diaminobenzanilide with salicylic acid, as described in Example 1. The reaction mixture was stirred overnight. The next morning it was heated to 60°–70°C. and slightly acidified to Congo red with 20° Be hydrochloric acid. It was filtered under vacuum and the resulting cake was squeezed dry.

The product thus obtained, after being dried at 70°–80°C., is useful in dyeing and printing on cellulosic fibers, providing reddish brown shades exhibiting an excellent stability to moisture and light.

EXAMPLE 3

13.8 parts of p-nitroaniline were suspended in 50 parts of H₂O and 35 parts of 20° Be HCl. After addition of 100 parts of ice it was diazotized by rapidly pouring thereinto a 20% solution (parts/volume) of 7 g. of NaNO₂ at a temperature of 10°C. Stirring was conducted for 30 minutes. A solution of 39 parts of H acid in 150 parts of H₂O and 14.6 parts of 36° Be NaOH was poured over 45 minutes at 0°–5°C. onto the clarified diazo solution, the pH value being 0.8–1.1. It was stirred overnight and the whole was poured onto a diazo-monoazoic mass separately prepared by coupling 4,4'-diaminobenzanilide with salicylic acid, as described in Example 1. Thereafter, 50 parts of ice were added and the pH value was brought to 8.5–9 with 16 parts of Na₂CO₃ dissolved in 70 parts of H₂O. It was stirred overnight. The next morning after it was heated to 70°C. and filtered under vacuum. The cake was squeezed out and then dried at 80°–90°C.

The resulting product dyes cellulosic and polyamide fibers bluish green with an excellent stabilty to moisture and light.

EXAMPLE 4

20.4 parts of 4,4'-diaminobenzanilide, suspended in 45 parts of H₂O and 52 parts of 20° Be HCl, after cooling with 200 parts of ice, were tetraazotized by dropping thereinto at 0°–5°C. a solution of 12.5 parts of NaNO₂ in 50 parts of H₂O. The mixture was stirred 1 hour at a pH of 1–1.5. The excess nitrous acid was removed using sulphamic acid.

13.5 parts of salicylic acid were dissolved in 180 parts of H₂O and 6.5 parts of Na₂CO₃, the pH value being 7.5. After addition of 100 parts of ice, the whole was poured, in the form of a fine stream, onto the tetraazotizaion mass. The pH value was brought to 9–9.5 by means of 29 parts of Na₂CO₃. Stirring was carried on for 3 hours at 0°–5°C. and a solution consisting of 17.2 parts of 1-naphthylamino-6- or -7 sulphonic acid dissolved in 270 parts of H₂O at 40°C. and 9.3 parts of 36° Be NaOH and cooled with 100 parts of ice was admixed thereto. It was stirred overnight. The next morning, the pH was brought to 2.5 with 42 parts of 20° Be HCl; after stirring for 15 minutes the pH value was raised to 8.5 with 22.5 parts of 36° Be NaOH to complete the coupling. The mass was mixed with 200 parts of ice, 60 parts of 60° Be H₂SO₄ and was diazotized by gradually introducing a solution of 11.5 parts of NaNO₂ in 50 parts of H₂O. Stirring was carried on until the next day, whereupon the excess nitrous acid was removed using sulphamic acid. A suspension, prepared as hereinafter described was admixed thereto: 16.3 parts of m-phenylenediamine were dissolved in 330 parts of water and brought to a pH of 5–5.5 with a 20° Be HCl. 270 parts of ice and 7.2 parts of sodium nitrite were added;

subsequently, over 3 hours, 26.1 parts of 20° Be HCl, diluted with 26.1 parts of H₂O, were introduced. The mixture was slightly acid to Congo red. Stirring was carried on at room temperature until the next day.

The mass was salted with 135 parts rock salt; the precipitated dyestuff was filtered under vacuum and squeezed dry. The cake was suspended in 400 parts of H₂O at 90°C. It was then homogenized and cooled with 300 parts of ice.

The coupling mass was brought to a pH of 7.5 with 120 parts of 36° Be NaOH and was kept under stirring until the next day. It was heated to 70°C. and salted with 90 parts of rock salt. It was filtered under vacuum and accurately squeezed dry. It was then dried at 80°C. The dyestuff thus obtained dyes cellulosic fibers with brown hues and good stability characteristics.

Variations can, of course, be made without departing from the spirit and scope of the invention.

Having thus described our invention, what we desire to secure by Letters Patent and hereby claim is:

1. A sulphonated azoic dyestuff of the formula:

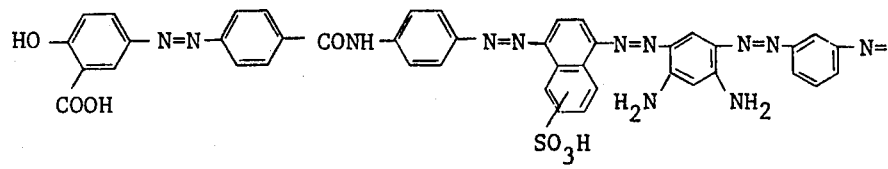

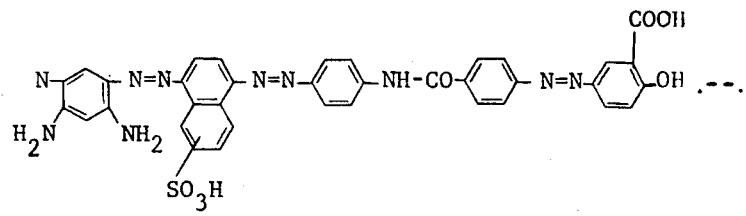

* * * * *

PO-1050
(5/69)

UNITED STATES PATENT OFFICE
CERTIFICATE OF CORRECTION

Patent No. 3,983,101                   Dated September 28, 1976

Inventor(s) SISTO SERGIO PAPA et al

It is certified that error appears in the above-identified patent and that said Letters Patent are hereby corrected as shown below:

Title page, after fourth formula:
should read:

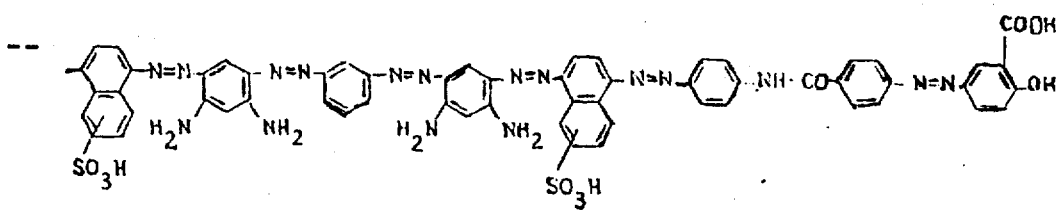

Column 3, line 3:  "5.5-6by" should read -- 5.5-6 by --.

Column 4, lines 49-50:  "tetraazotizaion" should read -- tetraazotization --.

Signed and Sealed this

Thirtieth Day of November 1976

[SEAL]

Attest:

RUTH C. MASON
*Attesting Officer*

C. MARSHALL DANN
*Commissioner of Patents and Trademarks*